May 15, 1928.  1,670,139

F. B. COCKBURN

LATHE

Filed May 8, 1925  4 Sheets-Sheet 2

Inventor
Francis B. Cockburn
By Wood & Wood
Attorneys

May 15, 1928.  
F. B. COCKBURN  
1,670,139  
LATHE  
Filed May 8, 1925  
4 Sheets-Sheet 3

Inventor  
Francis B. Cockburn  
By  
Attorneys

May 15, 1928. 1,670,139
F. B. COCKBURN
LATHE
Filed May 8, 1925 4 Sheets-Sheet 4

Inventor
Francis B. Cockburn

By
Attorneys

Patented May 15, 1928.

1,670,139

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

LATHE.

Application filed May 8, 1925. Serial No. 28,936.

This invention relates to improvements in lathes and in particular to the transmission for the spindle employing a cone pulley and belt drive and in mounting the transmission including an electric motor within a hollow leg beneath the headstock end of the leg producing a machine tool especially adaptable for toolroom work to the elimination of overhead belts and countershaft.

An object of the invention is to place all of the necessary transmission mechanism beneath the headstock of the lathe, utilizing the weight thereof to obtain the greatest possible stability to machine and freedom from vibration, and providing a machine organization with the transmission as a part of the machine, in compact arrangement and housed within the machine frame structure.

Another object is to mount the driving mechanism and electrical equipment therefor, including a motor for transmitting a belt, upon a hinged base or platform in such manner as to utilize the weight of the parts to apply tension to the belt, together with mechanism for positively swinging the platform to take its weight off of the belt, releasing the belt tension primarily for shifting the belts from one cone pulley step to another.

Another object is to provide an improved single piece belt shifter of simple construction by the use of which shifting of the belt can be easily and simply accomplished without undue wear of the belt.

Another object of the invention is to provide a belt shifter as a single member engaging respectively the approach or driving and return runs of the belt, and at a relative edge side thereof one in advance of the other in an order according to the direction of shift, whereby the belt can be shifted, when in a slack condition, onto a smaller step or diameter of one pulley before advancing the same onto a larger step or diameter of the other pulley which the belt connects.

Other objects and certain advantages will be more fully set forth in the description of the accompanying drawings forming a part of this application, in which.

Figure 1:
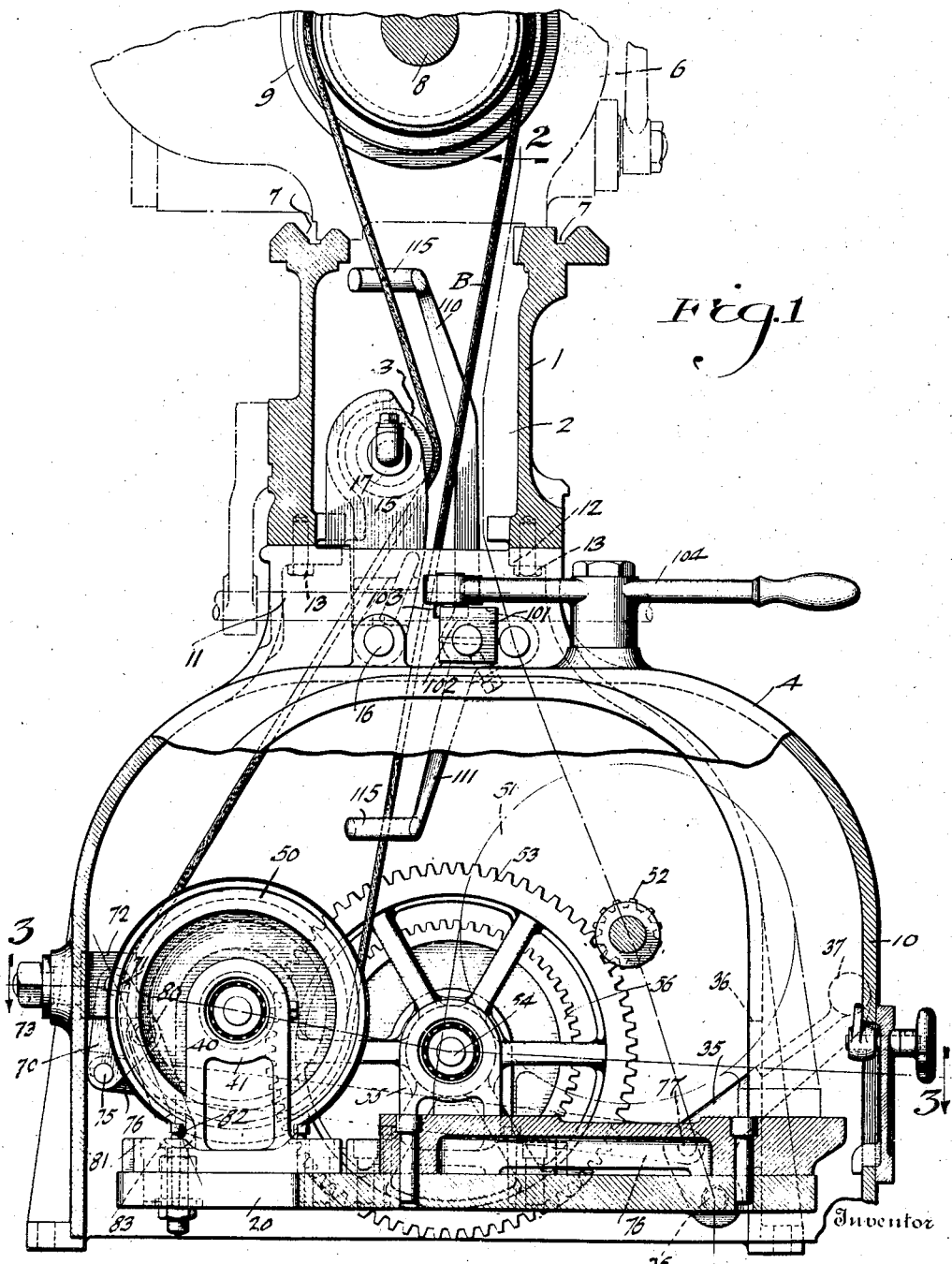
Figure 1 is an end section showing my invention applied to a lathe of the cone head type.

The drawings illustrate only the headstock end of the lathe, with a headstock of conventional form with a cone pulley drive for the spindle, the belt for the spindle pulley extending downwardly through the lathe bed and into the hollow leg of the machine and connecting with a pulley of the transmission mechanism including an electric motor supported and housed within the leg.

Referring to the drawings 1 indicates the lathe bed of the usual hollow form, so as to provide a passage 2 therethrough, beneath the headstock for the belt, and space for an idler pulley 3 for the belt and an upper arm of a belt shifter, the idler pulley and belt shifter being mounted within the upper portion of the leg 4.

The headstock 6 is mounted upon the bed ways 7, in the usual manner and has a spindle 8, carrying a cone pulley 9 keyed thereto. The cone lies over the opening or passage 2 in such position that the belt B engaged thereover leads downwardly through the bed of the lathe into the hollow supporting leg.

Figure 5:
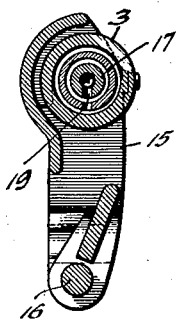
Figure 5 is a section on line 5—5, of Fig. 2, illustrating the construction of idler pulley for the belt.
Figure 4:
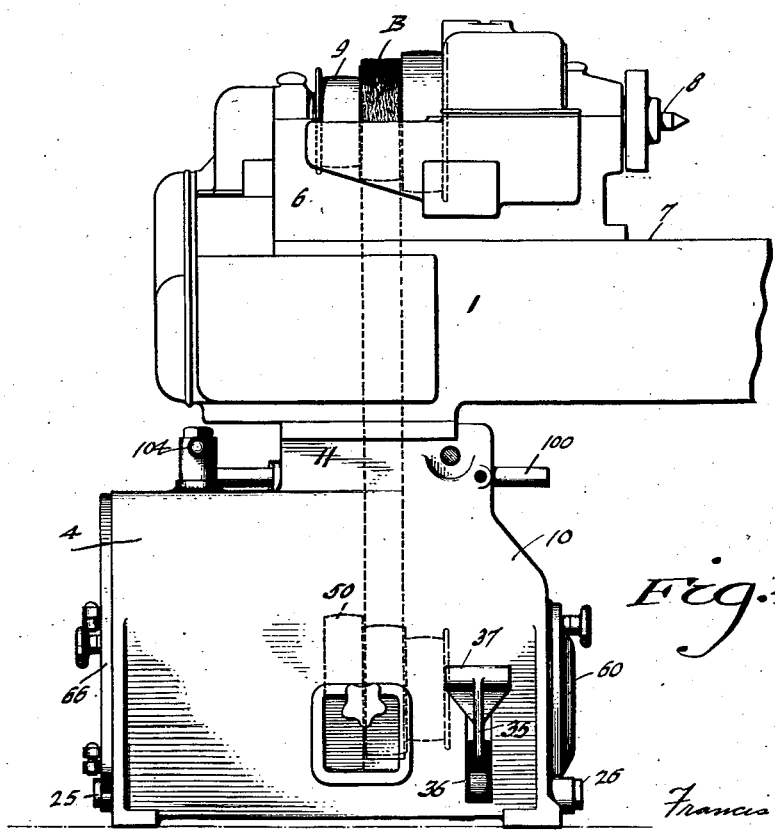
Figure 4 is a side elevation at the head end of a cone head lathe showing the unit in place.

The leg is preferably formed as shown and is of box-like construction, comprising the lower, large, substantially rectangular portion 10, and an upper smaller rectangular portion 11. This upper portion 11 has an internal marginal flange 12 through which bolts 13 extend securing the leg to the lathe bed. The leg opens at its upper side into the passage 2, thus permitting the belt B, disposed about the upper cone pulley 9 to extend downwardly into the lower portion of the leg. One run of the belt is engaged against the idler pulley 3 which is rotatably mounted in the vertically disposed frame 15 having oppositely disposed, elongated sides, the lower ends of which are traversed by a horizontally disposed rod 16, upon which the frame is thus pivotally mounted for a slight swinging movement. The idler 3 is mounted upon a hollow axial shaft 17 the bore forming an oil reservoir to which oil is fed through an elbow and cup 18, extending freely through a slot in the leg wall outwardly from the end of the shaft and in communication with its bore. The oil is conducted to the bearings through suitable openings 19, (see Fig. 5). The pulley frame extends upwardly within the opening of the bed, is supported by the leg as a housing and support for a driving unit and is removable therewith as a part of the unit.

In a longitudinal direction the leg extends beyond the end of the lathe bed, and so extends also in both directions transversely of the bed, (see Figs. 1 to 4).

Pivoted or hingedly attached in horizontal position within the leg at the lowest position permitting proper operation, is a plate 20 adapted to support, for yieldable vertical motion, the transmission mechanism including the motor for operating the spindle cone pulley. The hinge action of the plate is herein obtained by a pair of trunnions respectively 25, 26, (see Figs. 2 and 3). These trunnions have substantially the form of bolts or pins respectively extending inwardly from the opposite side walls of the leg and into sockets or bores 27, 28, in opposite edge or end faces of the plate. These pins are counterturned, (see Fig. 2), to provide shoulders 29, 30, respectively for preventing lateral movement of the plate, and for limiting the inward travel of the trunnions when screwed into position, the said trunnions being threaded as at 31, and also headed, for turning by wrench.

The plate is slotted inwardly from its edge as at 32 at right angles to the bore 28, and the pin 26 traverses one end of a lever 35, as a pivot therefor, the lever extending freely through a slot 36 in the side wall of the leg. The lever is broadened and terminally, transversely, cylindrically formed to provide a foot or hand engaging portion 37 by which the lever may be rocked for a purpose to be hereinafter disclosed.

The plate is thus pivotally or horizontally connected at opposite parallel edges, and adjacent one side, with the greater portion of the plate extending beyond its pivotal axis and in this instance in a direction transversely of the lathe bed, thus providing a treadle-like device.

Journaled upon the upper side of the plate and at that side farthest from its pivotal axis, and parallel with said axis, and with the headstock spindle, is a shaft 40 held at one extremity in a bearing 41 and adjacent the opposite extremity in a bearing 42 beyond the outer side of which it projects. The shaft is castellated, and removably engaged with the castellations is a gear 45 as a change gear. Midway between the bearings 41, 42, is keyed a driving cone pulley 50, in this instance having three steps corresponding in number to those of the headstock cone pulley 9 and reversely related to those steps of the upper pulley in the usual manner, with the belt B connecting the two pulleys as shown. Mounted also upon the upper side of the hinge plate adjacent the cone pulley is a motor 51 its major portion extending away from the pivotal axis of the plate toward the free end of the plate. This motor may be of any preferred type, and the electrical connections are not shown. The motor has a drive pinion 52 meshing with the gear 53 keyed to a shaft 54 journaled in bearings 42, 55, attached to the plate. The opposite end of this shaft is castellated and has removably engaged with the castellations a gear 56 as a change gear meshing with the gear 45, these two gears forming a change gear train, the gears of which may be changed or interchanged to obtain corresponding speed change between the driving motor and the driving cone. All the supporting bearings as well as the plate which supports the motor are removably attached to the plate, and therefore, may be conveniently removed. A hinged door 60 closes an opening 61 in the vertical wall of the leg, the door having a suitable hand operated latch for closing and locking the same, thus permitting access to the change gears 45, 56. Access to or removal of the motor may be obtained through the opening 65 closed by the door 66.

The hinged plate with its mountings arranged at one end at the same side of the pivotal axis, provides a weighted swinging element for applying a tension on the belt B. This driving unit acts as a belt tightener, and means is further provided for forcibly raising the same manually from a point outside the leg for releasing the belt tension particularly when the belt is to be shifted. To this end a toggle device is provided for forcibly lifting the plate and load thereon, one member 70 of which is pivoted as at 71 between the ears of the yoke 72 having a screw threaded extension traversing a vertical wall of the latch, the yoke being clamped in position by a nut 73. The swinging element 70 is herein of substantially triangular configuration. At the lower end of the element 70 is pivoted as at 75 a link 76, the opposite end of which is pivoted as at 77 to the lever 35 which is pivoted upon the trunnion 26.

Figure 6:
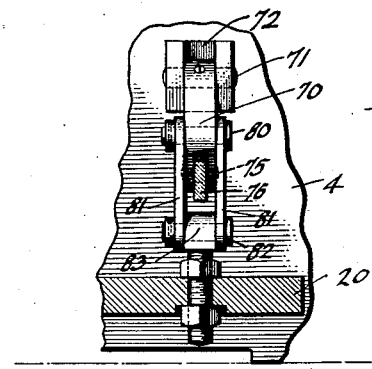
Figure 6 is a section on line 6—6, of Fig. 3, illustrating the structure of the tension relieving toggle.

Pivoted to the element 70, as at 80, intermediate the pivots 71, 75, are a pair of links 81 the lower ends of which are pivoted as at 82 at opposite sides of the block 83, attached to the plate by a bolt, and nuts, as best shown in Fig. 6. The upper end of the links also lie at opposite sides of the element 70. Normally the center of the pin 80 lies slightly to one side of the line drawn through the centers of the pins 71, 82 and in a direction away from the wall to which the element 70 is attached. By very slight movement of the lever 32 downwardly the plate is forcibly raised. The link 76 passes between the links 81, the lower end of the element 72 being slotted to pivotally receive the same. The plate raising device may in some instances be dispensed with, or other equivalent means for raising the plate may be conveniently used.

A belt shifter is incorporated as a part of the belt unit, and is mounted upon and within the unit for horizontal translation, in this instance, in a direction longitudinally of the bed, and of the axes of the driving and driven cone pulleys. The shifter is mounted on a rod 100 which traverses and is slidable in opposite side walls of the upper section 11 of the leg, and projects therebeyond at both sides. One end overlies the top horizontal portion of the lower section 10 of the leg and has a block 101 pinned thereto, the block being grooved on its upper side as at 102 and having slidably engaged therewith a pin 103, held at the outer end of one arm of the shifter lever 104, pivoted upon the top of the leg for oscillation in a horizontal plane. The outer end of the lever has a suitable handle which is accessible from the front side of the lathe whereby the shifter rod may be translated in any degree.

My improved shifter member comprises an elongated body portion including two arms 110, 111, the member being bored as at 112 intermediate its ends for the reception of a slide bar to which the member is fixedly secured by a set screw. Each arm has at its extremity a ring-like loop 115 adapted to be freely traversed by one run of the belt. Each loop is elongated in direction of shift or crosswise of the belt. The loops lie in parallel planes, in this installation in horizontal planes, and substantially vertically one above the other.

Figure 2:
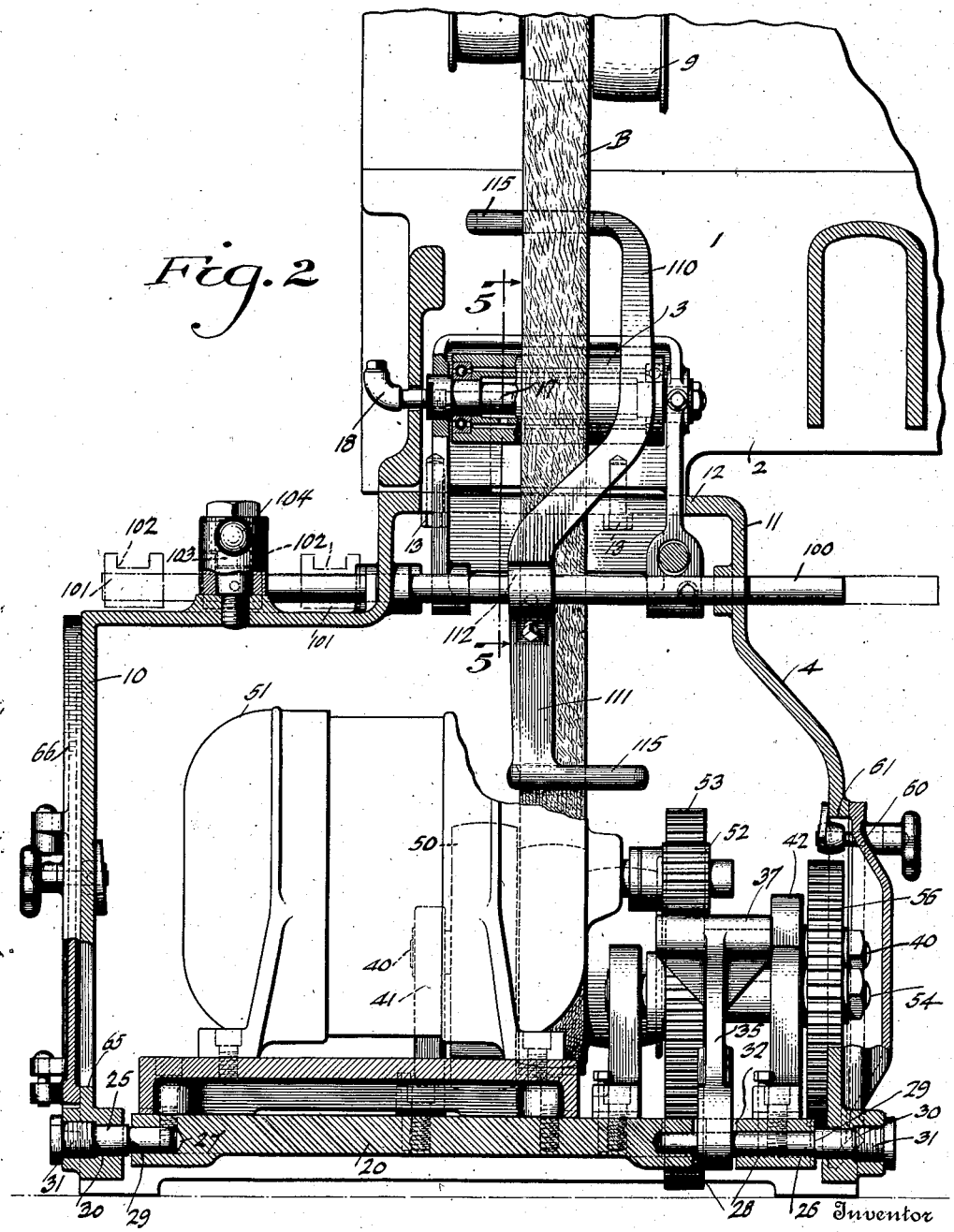
Figure 2 is a section at right angles to Figure 1, taken through the leg unit and bed.
Figure 3:
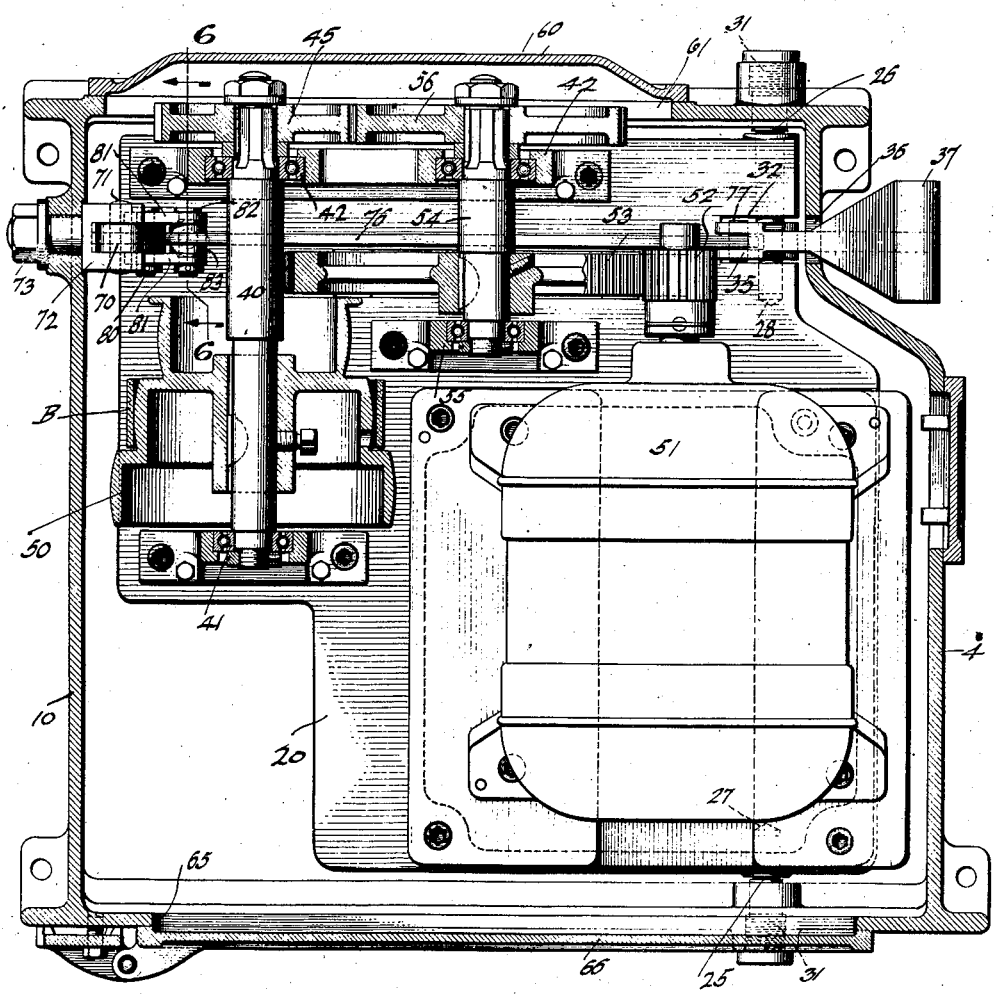
Figure 3 is a plan section of the leg on line 3—3, of Fig. 1, showing the mechanism supported therein and thereby.

The length of the slots is greater than the width of the belt, see Figure 2, and said slots extend beyond its edge in reverse directions at relatively opposite edges of the belt, whereby when the shifter is translated in either direction one edge of one run of the belt will be engaged before the opposite edge of the other run of the belt.

Normally, see Figure 2, an end wall of one loop is engaged against one edge of one run of the belt. The opposite end wall of the other loop is engaged against the opposite edge of the other run. Thus, when the belt is engaged with the steps of the driving and driven cones and the shifter is operated, one loop engages one edge of one run of the belt to release one loop from its cone step before the opposite edge of the other run is engaged to bring the other loop over the corresponding step of the other pulley.

The arm 110 is offset in direction of shift, see Figure 2, to provide clearance about the adjacent run which is operated by the loop at the end of the arm 111. Both arms are also terminally bent in the same direction and in a plane at right angles to the plane of the offset of the arm, see Figure 1, so that the idler pulley 3 may be disposed between the vertically aligned loops or rings to bring the belt runs nearer one another and thus compactly dispose the guide and shifter elements, and permit the shifter member to be translated without interference with the guide pulley 3.

Having described my invention, I claim:

A cone head lathe including a bed, a headstock and a cone pulley therefor, a hollow bed supporting leg adjacent and beneath the pulley, a plate hinged at one side to and within the leg horizontally disposed and adapted for limited vertical swinging movement, a second cone driving pulley journaled upon the plate at one side of the hinged pivot, a belt transmittably connecting the pulleys and extending through the bed, a motor upon the plate in driving connection with the second pulley, and means for forcibly raising the plate for relieving tension of the belt, said means comprising a link pivoted at one end to the side wall of the leg above the free end of the plate, a second link pivoted at an intermediate point of the first link and at its lower end to the plate at its unsupported side, the intermediate pivot of the three being disaligned from the others in direction away from the wall when the tension is being applied to the belt, and means for forcibly drawing the first link in a direction away from the wall.

In witness whereof, I hereunto subscribe my name.

FRANCIS B. COCKBURN.